Patented Sept. 14, 1937

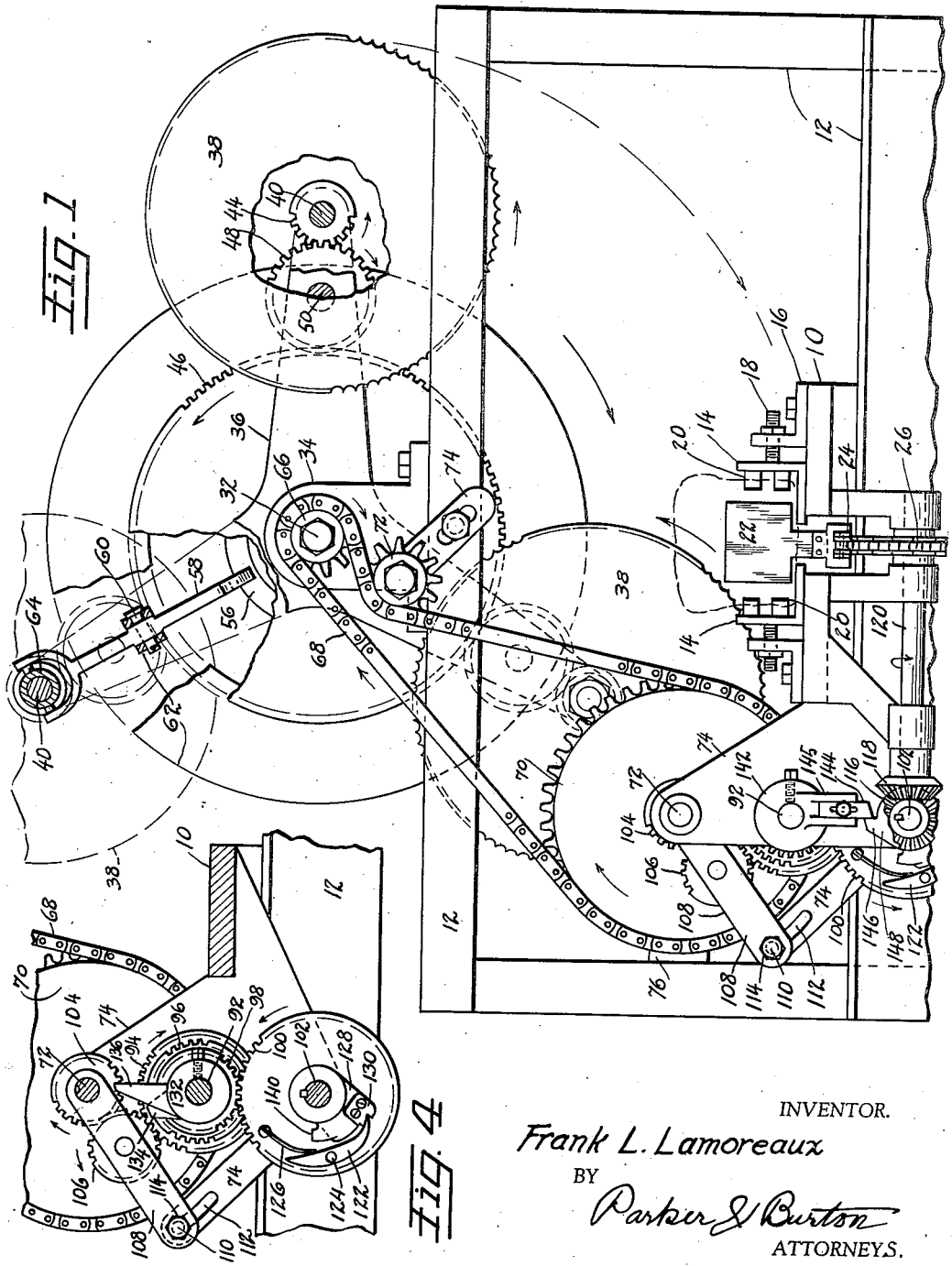

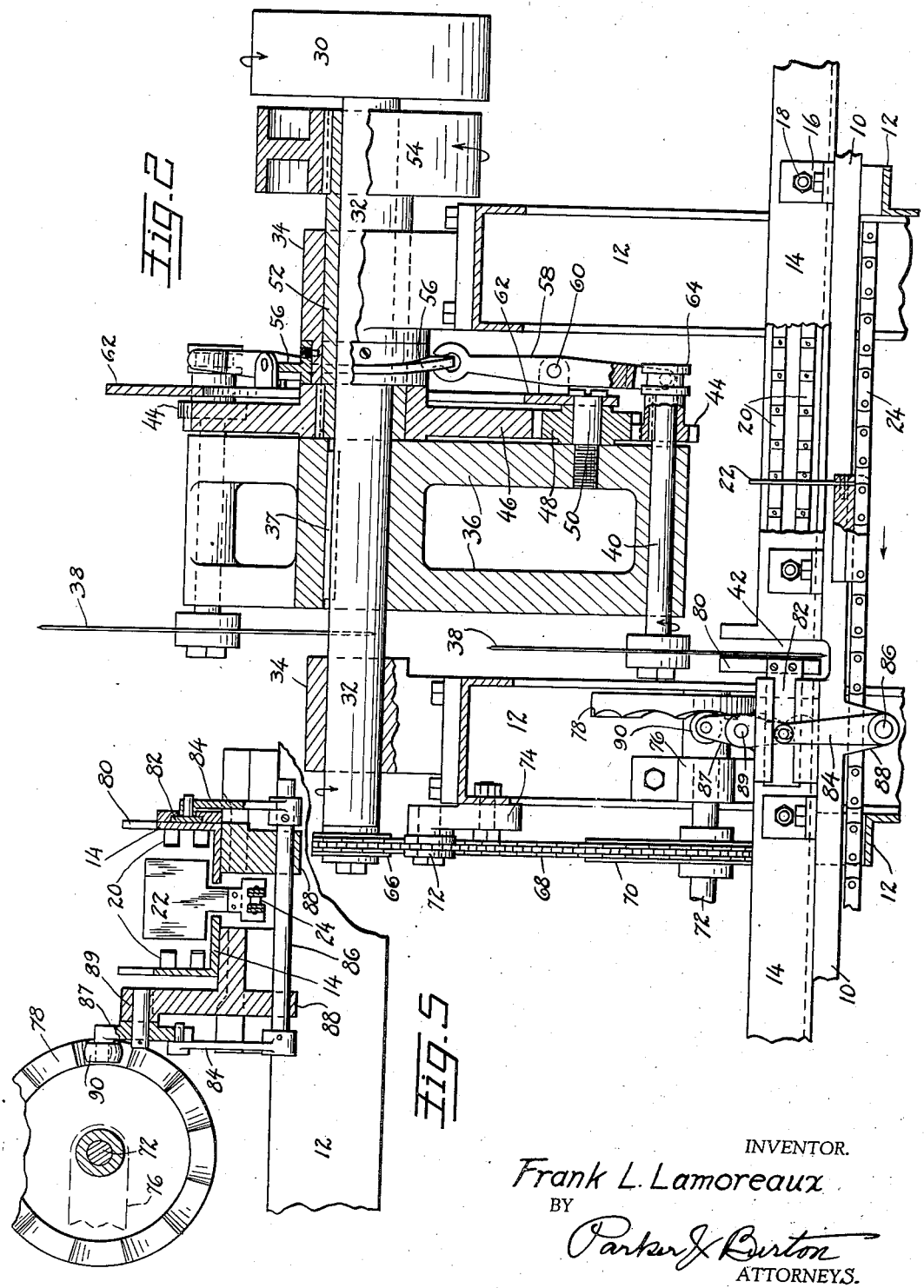

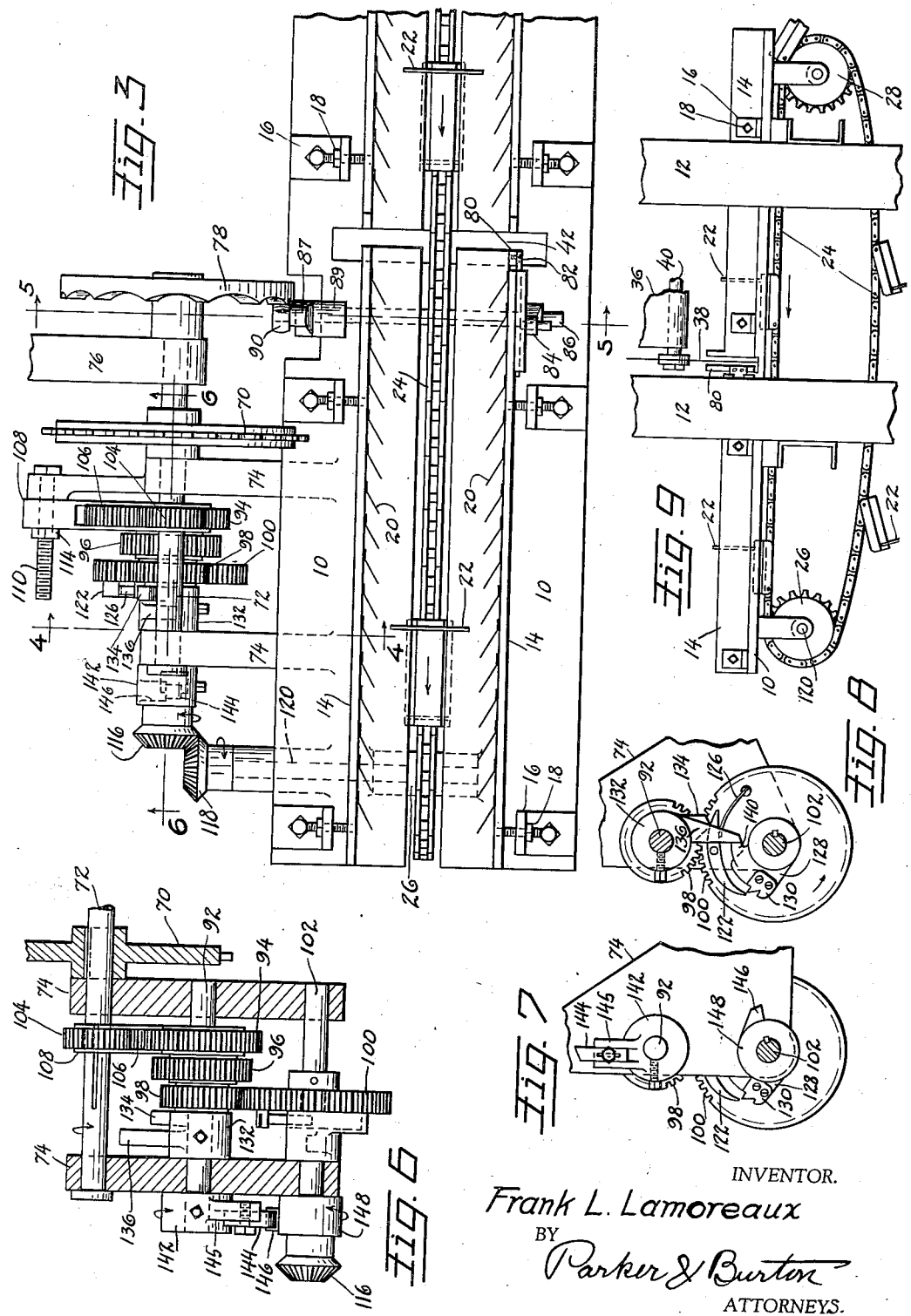

2,093,322

UNITED STATES PATENT OFFICE 2,093,322

BREAD SLICING MACHINE

Frank L. Lamoreaux, Detroit, Mich., assignor to Acme-Detroit Saw Corporation, Detroit, Mich., a corporation of Michigan Application March 31, 1934, Serial No. 718,322

21 Claims. (Cl. 146—101)

My invention relates to improvements in slicing machinery and particularly to improvements in a machine for slicing loaves of bread.

An object is to provide a machine for the slicing of bread with great rapidity, with economy of operation, and with a minimum of waste of the bread.

Another object is to provide a machine of this character which may be quickly adjusted to cut slices of different thickness whereby different kinds of bread may be cut into different thicknesses as desired.

Another object is to provide a bread slicing machine which will at all times cut the end slices from each loaf of bread to a thickness not less than the intended thickness of the slices.

Different batches of loaves of bread vary slightly in size. In cutting the loaves into a plurality of slices of a determined thickness it may happen that one end slice will result in a very thin shaving or sliver of bread. This is undesirable as it impedes the functioning of the wrapping machinery and such a slice is substantially valueless. My machine so functions that if the loaf is of such a length as to be not evenly divisible into slices of the determined thickness, the machine automatically functions to cut one end slice to a greater thickness so as to insure that all of the slices will at least equal the intended thickness.

The machine is characterized in that loaves of bread are moved endwise through a slicing trough in timed relationship with the movement of cutter knives transversely across the path of travel of the loaves whereby slices of uniform thickness, end of the thickness for which the machine is set, are cut from the moving loaves. As specifically illustrated, a plurality of circular cutter knives are individually journalled circumferentially spaced apart about the circumference of a rotatable knife carrier. These knives revolve with the rotation of the carrier to pass in succession transversely across the advancing loaves. The knives are controlled to advance axially with the loaves as they pass therethrough so that the slices cut from the loaves will each be of uniform thickness throughout.

A meritorious feature of my invention resides in the provision of conveyor mechanism adapted to advance the loaves endwise in uniformly spaced succession across the path of travel of the cutter knives and to properly support the loaves for slicing. The cutter knives are so moved through the loaves that each loaf is held securely against its support during its slicing. This conveyor mechanism is automatically adjustable to receive loaves of slightly varying size and easily manually adjustable to receive loaves widely varying in size.

An object of importance is the provision, in the driving mechanism which coordinates the rate of advance of the loaves with the rate of revolution of the cutter knives, of change speed mechanism selectively manually operable to vary the speed of the conveyor mechanism with respect to the movement of the cutter knives, while maintaining synchronism therewith, whereby slices of different thicknesses may be produced. Certain kinds of bread are generally sliced to one thickness. Other kinds of bread are generally sliced to another thickness and it may be desired to vary the thickness of the slice to meet certain demands. My machine may be quickly set to cut loaves of bread in slices of different thicknesses.

If the loaves to be cut are not of such a length as to be evenly divisable into slices of the predetermined thickness, the machine is selectively operable to automatically momentarily speed up the loaf conveyor at the instant each loaf enters into the path of revolution of the cutter knives whereby the first slice cut from each loaf has a greater rather than a less thickness than that proposed for the slicing. This eliminates the production of very thin end slices less than that predetermined.

The loaf conveyor is provided with loaf impelling devices uniformly spaced therealong. Control mechanism is provided which automatically functions following the cutting of the last slice from each loaf to momentarily increase the rate of advance of the conveyor speeding the movement of the impelling device across the path of revolution of the knives.

Following this increase of speed which moves the impelling device rapidly across the path of revolution of the knives, the rate of the advance of the conveyor mechanism is retarded sufficiently to accommodate for the advance. If the conveyor has been twice advanced, first to increase the thickness of the first slice and secondly to move the impeller mechanism across the path of revolution of the knives, this retardation of advance accommodates for both advances, thereby maintaining the intended synchronization.

Various other objects, advantages, and meritorious features of my invention will more fully appear from the following description, appended claims, and accompanying drawings, wherein:

Figure 1 is an end elevation of the discharge end of my bread slicing machine,

Fig. 2 is a longitudinal vertical section through the machine, partly broken away, Fig. 3 is a horizontal longitudinal section showing the conveyor and driving mechanism in plan, Fig. 4 is a vertical transverse section taken on the line 4—4 of Fig. 3 showing the change speed driving mechanism in end elevation, Fig. 5 is a vertical transverse section taken on the line 5—5 of Fig. 3, Fig. 6 is a vertical longitudinal section taken on the line 6—6 of Fig. 3 showing the change speed conveyor driving mechanism in elevation, Fig. 7 is an elevation of a fragment of the structure of Fig. 1 showing control mechanism associated with the conveyor drive to momentarily advance the speed thereof to increase the thickness of the slice, Fig. 8 is an elevation of a fragment of the conveyor driving mechanism shown in Fig. 1 showing control mechanism associated therewith to momentarily advance and momentarily retard the speed of the conveyor mechanism, and Fig. 9 is a fragmentary longitudinal elevation showing the conveyor mechanism.

My improved bread slicing machine is so constructed as to advance loaves of bread endwise in uniformly spaced succession through a slicing trough, wherein they are so supported that individual slices may be successively severed therefrom as they move along by cutter knives which are caused to pass successively transversely across the path of travel of the loaves.

Conveyor mechanism is provided to advance the loaves in predetermined uniform spacing. A plurality of rotating cutter knives are revolved to pass transversely across the conveyor mechanism. This conveyor mechanism is advanced at a rate of predetermined synchronous relationship with the rate of revolution of the cutter knives across the slicing trough in order that slices of uniform thickness will result. Change speed driving mechanism is provided which may be quickly manually set to vary the rate of advance of the conveyor with respect to the rate of movement of the cutter knives, but within a selected order of synchronizing relationship with the movement of the cutter knives, to cut the loaves of bread into slices of different thicknesses.

In the drawings the bed plate 10 of the machine is mounted upon a suitable framework 12 so that the machine is supported at the proper height from the floor for the convenience of the operator. This bed plate carries the slicing trough which comprises complementary angular wall sections 14. These wall sections may be manually adjusted toward or away from each other to accommodate bread of substantially varying width. The bed plate is shown as provided with angle brackets 16 and adjusting bolts and nuts 18 are carried thereby and are readily operable to change the relative position of the trough walls 14.

The inner face of each trough wall 14 is provided with a multiplicity of angularly projecting flexible fingers or feathers 20 which serve to automatically center and support loaves of bread of slightly varying width centrally within the trough to be advanced therethrough by the conveyor mechanism. These fingers properly support the loaves of bread for slicing and for advancement.

It will be noted that the bottoms of the angular trough walls 14 are spaced apart so that paddles or loaf impelling members 22, carried by the conveyor chain 24 disposed below the trough, may be advanced lengthwise through the trough. These paddles 22 are spaced apart a predetermined uniform distance along the chain. The chain travels underneath the trough with the paddles moving through the trough, as appears in Figs. 1, 3, and 9, and is supported at opposite ends upon sprockets 26 and 28.

The conveyor chain is suitably driven as hereinafter described and loaves of bread are placed in the trough so that each paddle serves to push a loaf of bread endwise through the trough. The uniformly spaced relationship of the paddles along the chain arranges the loaves of bread in a predetermined uniformly spaced succession as they are advanced. Cutter mechanism is provided to slice the loaves as they are advanced through the trough.

This cutter mechanism is more clearly shown in Figs. 1 and 2. In Fig. 2, 30 indicates a pulley mounted on a shaft 32 which is journalled in supports 34 upon the framework of the machine. A cutter carrier in the form of a spider 36 is keyed at 37 to the shaft. In Fig. 1 this spider is shown as having three arms. At the extremity of each arm a serrated saw-like cutting knife 38 is journalled for rotation. Three of these knives are here shown. Each knife is secured upon a shaft 40, as shown in Fig. 2, to rotate therewith. These shafts are journalled in the ends of the arms of spider 36 and extend therethrough. As the shaft is rotated the cutter knives are revolved to pass in succession through a cutter-way 42 formed in the trough 14. Pulley 30 which rotates the shaft is suitably driven from a source of power not shown.

The shafts 40 upon which cutter knives 38 are mounted extend through the spider. Each shaft is provided upon its opposite end with a pinion 44. These pinions are driven from a ring gear 46 through idler pinions 48. There is an idler pinion 48 for each pinion 44. The idler pinion is journalled on a stub shaft 50 carried by the spider 36. Ring gear 46 is splined to a sleeve 52, which is supported upon the shaft 32 as shown in Fig. 2. This sleeve 52 is provided with a pulley 54 arranged alongside of the pulley 30 on the shaft 32. The pulley 54 is suitably driven from an approved source of power in a conventional manner in synchronism with the pulley 30, but in the opposite direction, for a purpose hereinafter more fully described.

It will now appear that upon rotation of the shaft 32 the spider is rotated causing the cutter knives 38 to revolve and to pass during their revolution through the cutter-way 42. Upon rotation of the sleeve 52 the ring gear 46 drives through the idlers 48 the pinions 44 which are keyed to the shafts 40 which shafts carry the cutter knives and the cutter knives are rotated. The cutter knives are rotated, as appears from the arrows shown in Fig. 1, in a counter clockwise direction while the spider is rotated in a clockwise direction. The reason for this will hereinafter appear.

As the conveyor chain 24 continuously advances each loaf transversely across the path of revolution of the cutter knives means have been provided to cause each cutter knife, as it passes each time through a loaf to advance at an even rate and in the same direction therewith so that the slices cut from the loaves are uniform throughout in thickness. This is accomplished by moving each cutter knife axially in the same direction as the loaf as it passes through a loaf.

This axial movement of each cutter knife is obtained through the employment of a stationary cam 56 secured to the support 34 as shown in Fig. 2. This cam has an axially deflected portion at its lowermost extent as shown in Fig. 2. A rocker arm 58 is pivoted at 60 to element 62 carried by the spider. This rocker arm is forked at one end to embrace the cam and at the opposite end to engage the grooved end 64 of the hub of pinion 44 which is keyed to the cutter knife shaft 40.

The shaft 40 is longitudinally shiftable through its bearing in the spider 36 having a permitted clearance for this purpose. It therefore will appear that upon rotation of the spider 36 the travel of the forked end of the rocker arm 58 about the stationary cam 56 will rock the arm upon its pivot 60 and move the shaft 40 endwise to cause the cutter knives 38 to be moved axially as the spider revolves.

This cam is so arranged that the cutter knife is moved axially in the direction of travel of the conveyor chain 24 and at an equal rate of movement therewith during the time the cutter knife is passing through the slicing trough. The cutter-way 42 through the trough is of such a width as to permit this axial movement of the cutter knife as it passes through the trough. This insures that the cutter knife will sever a slice of uniform thickness as it passes through the moving loaf of bread.

From Fig. 2 it will appear that the direction of revolution of the cutter knives would tend to tilt each loaf of bread upwardly as the knife passed therethrough, but the knives are rotated in the opposite direction which tends to hold the bread downwardly in the trough where it is properly supported for slicing.

The shaft 32 is extended and provided with a gear 66 at the end opposite the pulley 30. This construction is shown particularly in Figs. 1 and 2. A drive chain 68 couples this gear with a large driving gear 70. An idler pinion 72 carried by a bracket 74, adjustable upon the upper frame work 12 of the machine as shown in Fig. 1, holds the drive chain 68 out of the way of the slicing trough. The large driving gear 70 is keyed to a shaft 72 which is journalled within bearings upon supports 74 and 76 shown in detail in Fig. 3.

The shaft 72 carries a castellated jumping cam 78 shown in detail in Figs. 2, 3, and 5. This cam is adapted to operate a closure gate 80 for one side of the slicing trough at the cutter-way 42 in synchronism with and immediately in advance of the axial movement of the cutter knife as it moves through the cutter-way. This gate appears particularly in Figs. 2 and 5. This closure gate 80 is located adjacent the cutter-way on that side of the slicing trough entered by the knife and advances ahead of the cutter knife as it moves lengthwise of the trough. The gate engages the side edge of the slice already cut and urges this end of the slice in the direction of the advancement of the conveyor so that the body of the cutting knife cannot draw out the softer interior of the slice as it revolves past.

This closure gate 80 is actuated by an element 82 connected through an arm 84 with a rocker shaft 86 journalled in bearings 88 as shown in Fig. 5. There is an arm 84 on each side of the trough. One of these rocker arms is coupled through a second rocker arm 87, which is pivoted at 89, with the cam 78 to be oscillated thereby. The rocker arm 87 has a part 90 which travels over the face of the cam as shown in Figs. 3 and 5 and oscillates the shaft 86 and the closure gate 80 so that the gate moves lengthwise through the trough ahead of the knife 38.

The conveyor chain 24 is driven from the shaft 72 through a train of change speed gearing upon shaft 92 which shaft is journalled within supports 74 (Figs. 3, 4 and 6). Three of these gears are provided, indicated as 94, 96, and 98. These gears are keyed to shaft 92. Gear 98 drives an idler gear 100 which is free upon shaft 102.

The train of gears 94, 96, and 98 are driven by the gear 70 through pinions 104 and 106. Pinion 106 is an idler pinion tied through forked link 108 with pinion 104. The idler pinion 106 is adapted to be placed in mesh with either one of the gears 94, 96, and 98. In Figs. 4 and 6 it is shown in mesh with gear 94. The pinion 104 is keyed to the shaft 72 but is slidable lengthwise thereover to bring pinion 106 into mesh with either one of the gears 94, 96, or 98. The opposite end of the link 108 is mounted upon a stud 110 carried by the support 74 so that the link is adjustable over the stud to bring the idler pinion 106 into mesh with either one of the gears 94, 96, and 98. This stud is adjustable through slot 112 in support 74 to permit pinion 106 to fall into mesh with gears 96 and 98. A nut 114 is shown on stud 110. Additional spacers might be provided.

The thickness of the slice is determined by which gear 94, 96, or 98 is engaged by the idler pinion 106 for driving. These gears are of such a size and number of teeth that whichever gear is being driven through the chain it is advanced in timed relationship with the revolution of the knives through the cutter-way. If gear 94 is proportioned and formed to advance the conveyor chain at such a rate of speed with respect to the revolution of the knives as to cut slices of ½ inch thickness gear 96 might, for example, produce slices of 7/16 inch thickness and gear 94 slices of ¾ inch thickness.

Idler gear 100 drives the shaft 102, which shaft through spur pinion 116 meshed with spur pinion 118, drives shaft 120 upon which is keyed the sprocket 26 which drives the conveyor chain 24. The shaft 102 is driven by the idler gear 100 through a pawl or ratchet member 122. This pawl is pivoted at 124 to the gear 100 and held by spring 126 normally in engagement with the toothed segment 128. The segment is keyed to the shaft 102 to rotate the shaft. The pawl is in driving engagement with the toothed segment as shown in Fig. 4.

This toothed segment 128 is provided with a removable block 130 shown in the several figures of the drawings as having two teeth. A block having one tooth may be substituted for this two toothed block for purposes hereinafter described if the same is desired.

Shaft 92 carries the hub 132 which is provided with two lugs 134 and 136. Lug 134 is disposed to bear against the heel of the pawl 122 as shown in Fig. 8. The rotation of shaft 92 brings this lug into this bearing engagement with the pawl so as to move the pawl out of its position of driving engagement with the toothed segment 128. This release of the pawl from its driving engagement with the segment breaks the driving connection from gear 100 to shaft 102.

Lug 136 is so arranged that when the lug 134 releases the pawl 122 from its position of driving engagement, as just described, lug 136 engages the shoulder 140 of the segment 128 to rotate the shaft 102. The engagement of the lug 136 with the shoulder 140, due to the proportion and relationship established, advances the speed of rotation of the shaft 102 over that normally imparted thereto when being driven by the gear 100 through the pawl. This momentarily speeds up the conveyor chain.

The construction is such that this momentary increase in the rate of advance of the conveyor chain occurs as the loaf impelling element or paddle 22 approaches the cutter-way 42 to pass thereover. While the construction and synchronization of movement of the mechanism is such that the paddle 22 would normally move over the path of revolution of the cutter knives without interruption therewith and without thus being speeded up, this increased speed given to the conveyor chain absolutely assures that no matter at what speed the chain is travelling the paddle will move safely through without interfering with the revolution of the knives.

When the lug 136 disengages the shoulder 140 the rotation of the shaft 102 is arrested until the pawl 122 again picks up the toothed segment 128 as shown in Fig. 4. The time of this pick up is determined by the bearing of the lug 134 upon pawl 122. The spring 126 holds the pawl to engage the segment. This lag or interruption in the advance of the conveyor chain produces such an interruption in the advance of the chain as to compensate for the acceleration which has been given thereto by the speeding of the paddle over the path of revolution of the knives.

As this speeding up of the paddle occurs each time a loaf is moved through the knives this retardation of the chain occurs following each completion of the movement of the loaf through the knives, and the normal relationship of movement between the chain and the knives is resumed following the slicing of each loaf of bread.

If this were the only control necessary to be exercised over the conveyor chain it would not be essential to provide a segment with two teeth as shown in the figures of the drawings. The removable block 130 might be provided with merely one tooth and the above described functioning would take place. If it is desired, however, to exercise a second control over the speed of the conveyor chain for a purpose to be described, the removable block 130 is shown provided with two teeth.

This second control is for the purpose of insuring that the first slice of bread cut from the loaf shall be at least of full thickness. If the loaves to be sliced are of such a length and size as not to be evenly divisible into slices of the predetermined thickness one end slice would be of reduced thickness were it not for this second control. The size of the loaf might be such that this end slice would be merely a sliver. As this is highly undesirable and impedes the functioning of the wrapping mechanism, which follows the slicing, this second control is provided to prevent the formation of such a sliver. As this condition of length of loaves is one of frequent occurrence this second control is a feature of importance.

If examination and test of the batch of loaves to be sliced indicates that the first slice from each loaf will have a thickness of, for example, ⅛ inch instead of the intended ½ inch this control mechanism is adapted to momentarily speed up the conveyor chain as each loaf carried thereby enters the path of revolution of the knives so that the first slice cut from each loaf will have a thickness of ⅝ inch. The remaining slices would be of the intended ½ inch thickness.

This control mechanism comprises an element 142 keyed to shaft 92. This element carries lug 144. This lug is slidably adjustable within the forked guide 145 of element 142 so as to be projected to engage shoulder 146 formed on hub 148 keyed to shaft 102. The lug may be withdrawn out of engagement with the shoulder 146 if desired. If it is unnecessary to thus cut the first slice of the loaf oversize the lug 144 is withdrawn so as not to engage shoulder 146. If it is necessary to thus increase the thickness of the first slice to be removed from the loaf the lug 144 is projected to engage the shoulder 146.

This lug 144 functions when it engages shoulder 146 to cause the shaft 102 to advance its rotation over-running gear 100 sufficiently to bring the pawl into engagement with the second tooth of the segment 128. This speeding up is sufficient to increase the thickness of the first slice as desired. The driving then continues through the second tooth until the slicing of the loaf is completed. When the slicing of the loaf is completed and as the paddle reaches the path of revolution of the knives the first control mechanism hereinabove described comes into play to accelerate momentarily the speed of the chain to move the impelling paddle over the path of the knives.

The member 142 is so adjusted on the shaft 92 that the period of engagement of the lug 144 with the shoulder 146 is so regulated that this momentary advance of the speed of the conveyor chain occurs at the instant the loaf is entering upon the path of revolution of the knives and is of such a rate as to increase the speed of the chain by what would amount to the thickness of one slice so that the first slice cut from the loaf is thereby increased in thickness.

These control mechanisms function automatically during the running of the machine. The control mechanism first described, which functions to move the paddle over the path of revolution of the knives, functions at all times, though it could be removed if it were found wholly unnecessary. The mechanism is selective. It may be set to function as desired. It operates in timed relationship with the change speed driving mechanism so as to function with any thickness of slice that is being cut.

What I claim:

1. A bread slicing machine having a loaf slicing trough provided with a transverse cutter-way, loaf conveying mechanism adapted to advance loaves of bread lengthwise through the trough, a knife movable through said cutter-way in timed relationship with the conveying mechanism, said knife movable lengthwise of the trough during movement of the knife through the cutter-way, a gate for the cutter-way on one side wall of the trough, means adapted to advance the gate lengthwise of the trough as a closure for the cutter-way in timed relationship with the advance of the knife lengthwise of the trough as it moves through the cutter-way.

2. A bread slicing machine comprising, in combination, a circular knife journalled for revolution and journalled for rotation during its revolution, means for revolving said knife, means for rotating said knife, loaf conveying mechanism adapted to advance uniformly spaced apart loaves of bread transversely across the path of revolution of said knife and in timed synchronism with the revolution of the knife including a loaf impelling device engaging each loaf, means operable automatically to momentarily increase the rate of advance of the conveying mechanism as a loaf carried thereby enters the path of revolution of the knife, means operable automatically to momentarily increase the rate of advance of the conveying mechanism as each loaf impelling device crosses the path of revolution of the knife, and means operable to momentarily retard the advance of the conveying mechanism following said two increases of its rate of advance.

3. A bread slicing machine comprising, in combination, a rotatably journalled knife carrier, a plurality of circular knives independently journalled and circumferentially spaced about the circumference of said carrier to be revolved thereby, means for rotating said carrier, means for rotating said knives during their revolution, a bread slicing trough extending transversely across the path of revolution of said knives, bread loaf conveying mechanism adapted to advance a spaced apart plurality of loaves of bread through the trough across the path of revolution of said knives and in timed synchronization with said revolution including a loaf impelling device urging each loaf through the trough, means for advancing each knife axially in timed relationship with the advance of the loaves through the trough and through that arc of revolution of the knife wherein it crosses the loaf, means automatically operable to momentarily increase the rate of advance of the conveyor mechanism as each loaf impelling device crosses the path of the knives, and selective control means automatically operable to momentarily increase the rate of advance of the conveying mechanism as each loaf enters the path of revolution of the knives.

4. A bread slicing machine having, in combination, a rotatably journalled knife carrier, a plurality of circular knives independently journalled and circumferentially spaced about the circumference of said carrier to be revolved thereby, driving mechanism rotating said carrier, driving mechanism rotating said knives during their revolution, loaf conveying mechanism adapted to advance a succession of loaves transversely across the path of revolution of the knives, change speed mechanism operatively coupling said conveying mechanism and said carrier driving mechanism and selectively operable to vary the rate of advance of the conveying mechanism relative to the revolution of said knife carrier to vary the thickness of the slices cut, loaf impelling devices uniformly spaced along the length of said conveying mechanism, mechanism operable automatically to momentarily increase the rate of advance of the conveying mechanism as each loaf impelling device crosses the path of revolution of the knives.

5. A bread slicing machine having, in combination, a rotatably journalled knife carrier, a plurality of circular knives independently journalled and circumferentially spaced about the circumference of said carrier to be revolved thereby, driving mechanism rotating said carrier, driving mechanism rotating said knives during their revolution, loaf conveying mechanism adapted to advance a succession of loaves transversely across the path of revolution of the knives, change speed mechanism operatively coupling said conveying mechanism and said carrier driving mechanism and selectively operable to vary the rate of advance of the conveying mechanism relative to the revolution of said knife carrier to vary the thickness of the slices cut, loaf impelling devices uniformly spaced along the length of said conveying mechanism, mechanism operable automatically to momentarily increase the rate of advance of the conveying mechanism as each loaf impelling device crosses the path of revolution of the knives, and mechanism operable to momentarily arrest the advance of the conveying mechanism following the passing of each loaf impelling device across the path of revolution of the knives to compensate for said acceleration in advance.

6. A bread slicing machine comprising, in combination, a circular knife journalled for revolution and for rotation during its revolution, means for revolving said knife, means for rotating said knife, loaf conveying mechanism for advancing loaves of bread transversely across the path of revolution of said knife, means for driving said conveying mechanism at a continuous rate, and means included in said driving means operable to momentarily speed the continuous advance of the conveyor as a loaf carried thereby enters the path of revolution of the knife.

7. A slicing machine comprising, in combination, a knife supported for slicing movement, means for moving said knife in slicing motion, a conveyor for advancing material transversely across the path of the slicing movement of the knife to be sliced thereby, means for driving said conveyor at a continuous rate, means for mounting said knife for bodily shiftable movement parallel with the direction of advancement of the material, and means responsive to the slicing movement of said knife to bodily shift said knife at substantially the same rate with and in the same direction as the advancement of the material during the passage of the knife through the material.

8. A slicing machine comprising, in combination, a plane knife journalled for rotation and for axial movement, a knife carrier adapted to impart slicing movement to said knife, a support for said knife carrier, a conveyor for feeding material past the path of movement of said knife so as to be sliced thereby, means for driving said conveyor continuously, and mechanism operatively coupling said knife with said carrier support and responsive to the movement of said carrier to axially move said knife in the same direction and at substantially the same rate as the continuously moving conveyor while the knife passes through the material.

9. The method of slicing material which comprises continuously advancing the material to be sliced along a given path, passing a cutter transversely through the continuously advancing material from one side of the path of movement of the material to the other side to cut slices from the material, and bodily advancing said cutter as the cutter passes through the material in the same direction as the material and at substantially the same rate of advance.

10. The method of cutting slices of variable thickness of material which comprises continuously advancing the material to be cut, passing a plurality of cutters in succeeding order transversely through the advancing material, bodily shifting each cutter in the same direction and at substantially the same rate as the advancing material as the cutters pass therethrough, and varying the speed of advance of said material with respect to the transverse movement of the cutters for varying the thickness of the slices cut from the material.

11. A bread slicing machine comprising, in combination, a rotatably journalled knife carrier, a circular knife journalled thereon, means for rotating said knife carrier to revolve said knife, means for rotating said knife during its revolution, a conveyor for advancing a loaf of bread transversely across the path of revolution of said knife, means for driving said conveyor, and change speed mechanism operatively coupling said carrier rotating means and said conveyor driving means, said change speed mechanism adapted to vary the rate of advance of said conveyor relative to the rate of revolution of said knife whereby varying thicknesses of slices may be cut.

12. A bread slicing machine comprising, in combination, a rotatably journalled knife carrier, a circular knife journalled thereon, means for rotating said knife carrier to revolve said knife, means for rotating said knife during its revolution, means for advancing a loaf of bread transversely across the path of revolution of said knife to be sliced thereby, said knife being mounted on said carrier for axial bodily movement, and means responsive to the rotation of the carrier for bodily shifting said knife axially in the same direction as the loaf during a portion of its revolution and while passing through the loaf.

13. A bread slicing machine comprising, in combination, a rotatably journalled knife carrier, a plurality of circular knives independently journalled and circumferentially spaced about said carrier to be revolved thereby, loaf conveying mechanism adapted to advance a succession of loaves of bread transversely across the path of revolution of the knives and in timed synchronism with said revolution, means for rotating said carrier, means for rotating the knives in a direction opposite to the direction of their revolution, means supporting said knives on said carrier for bodily movement and means operatively connected to said carrier and responsive to the revolution thereof for bodily shifting each knife at an even rate with and in the same direction as the loaf through which it is passing.

14. Bread slicing machinery comprising, in combination, a circular knife journalled for revolution and rotation, means for revolving said knife, means for rotating said knife, said knife being mounted for bodily movement axially, means for bodily moving said knife axially throughout a given arc of its revolution, and loaf conveying mechanism adapted to advance a loaf of bread transversely across that arc of revolution of the knife throughout which the knife is moved axially.

15. Bread slicing machinery comprising, in combination, a circular knife journalled for revolution and rotation, means for revolving said knife, means for rotating said knife, a bread loaf supporting trough extending transversely across the path of revolution of said knife provided with a cutter-way through which the knife passes in its revolution, loaf conveying mechanism adapted to advance a spaced apart plurality of loaves of bread through said trough across the path of revolution of the knife, means supporting said knife for bodily movement axially, and means for bodily moving the knife axially at a uniform rate with the conveying mechanism and in the same direction during the passage of the knives across the trough.

16. A bread slicing machine comprising, in combination, a circular knife journalled for revolution and journalled for rotation during its revolution, means for revolving said knife, means for rotating said knife, loaf conveying mechanism adapted to advance uniformly spaced apart loaves of bread transversely across the path of revolution of said knife, means for advancing said conveying mechanism at a continuous rate, and means for selectively varying the continuous rate of advance of said conveying mechanism relative to the speed of revolution of said knife to vary the thickness of the slices cut from the advancing loaves.

17. A bread slicing machine comprising, in combination, a circular knife journalled for revolution and journalled for rotation during its revolution, means for revolving said knife, means for rotating said knife, a conveying mechanism including spaced apart loaf impelling devices each engaging a loaf of bread, means for continuously advancing said conveying mechanism across the path of revolution of said knife, means for synchronizing the advance of said conveying mechanism with the revolution of said knife, and means operable to momentarily increase the rate of advance of said conveying mechanism as each loaf impelling device crosses the path of the knife.

18. A slicing machine comprising, in combination, a plane knife, a knife carrier adapted to impart slicing movement to said knife, a conveyor for progressively feeding material past the path of movement of said knife so as to be sliced thereby, means for driving said conveyor at a continuous rate, means on said carrier for supporting said knife for bodily movement perpendicular to its slicing motion and parallel to the direction of the advance of said material, and means responsive to the slicing movement of said knife for bodily shifting said knife perpendicular to its slicing motion and in the direction of and at substantially the same rate as the feed of said conveyor.

19. A bread slicing machine comprising, in combination, a loaf conveying mechanism adapted to advance loaves of bread, a cutter-way across which the conveyor advances the loaves of bread, a knife operable to pass through said cutter-way and slice the loaves as they are advanced therethrough, and a member adjacent the cutter-way on that side of the cutter-way entered by said knife adapted to engage the side of each slice as it is cut from the load, means supporting said member for movement parallel to said conveying mechanism, and means operable to move said member for a substantial distance in said supporting means and in the direction of the conveyor advance as each slice is being cut whereby the slice is drawn away from the knife as the knife leaves the cutter-way.

20. A bread slicing machine including, in combination with a conveyor for advancing loaves of bread and a cutter for slicing said loaves, a member positioned adjacent said conveyor adapted to engage the cut edge of the slice being cut from a loaf, means supporting said member for movement parallel to said conveyor, and means for moving said member parallel to said conveyor and in the direction of the conveyor advance as each slice is being cut so as to urge the slice away from frictional engagement with the body of the cutter as the latter passes through the loaf.

21. A slicing machine comprising, in combination, a cutting knife, a carrier for said knife, means operable to move said carrier and impart slicing motion to said knife, means on said carrier supporting said knife for bodily movement perpendicular to the path of its slicing motion, a cam adjacent the path of movement of said carrier, mechanism operatively associated with said cam and said knife and operable to bodily move the knife perpendicular to its path of slicing motion as the carrier moves relative to the cam.

FRANK L. LAMOREAUX.